United States Patent
Sun

(10) Patent No.: US 9,165,403 B2
(45) Date of Patent: Oct. 20, 2015

(54) PLANETARY SCALE OBJECT RENDERING

(75) Inventor: Wei Sun, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 13/007,161

(22) Filed: Jan. 14, 2011

(65) Prior Publication Data

US 2012/0182298 A1 Jul. 19, 2012

(51) Int. Cl.
*G06T 15/00* (2011.01)
*G06T 17/20* (2006.01)
*G06T 17/00* (2006.01)
*G06T 17/05* (2011.01)

(52) U.S. Cl.
CPC .............. *G06T 17/20* (2013.01); *G06T 17/005* (2013.01); *G06T 17/05* (2013.01); *G06T 2210/36* (2013.01)

(58) Field of Classification Search
CPC ....... G06T 17/20; G06T 17/205; G06T 15/04; G06T 15/005; G06T 11/40
USPC .................................................. 345/423, 420
See application file for complete search history.

(56) References Cited

U.S. PATENT DOCUMENTS

| | | | | |
|---|---|---|---|---|
| 5,602,550 A | * | 2/1997 | Stein | 341/76 |
| 6,289,131 B1 | * | 9/2001 | Ishikawa | 382/240 |
| 6,373,489 B1 | * | 4/2002 | Lu et al. | 345/428 |
| 6,850,235 B2 | | 2/2005 | Levanon | |
| 6,879,324 B1 | | 4/2005 | Hoppe | |
| 7,102,636 B2 | | 9/2006 | Reshetov et al. | |
| 7,538,769 B2 | | 5/2009 | Hoppe | |
| 8,593,455 B2 | | 11/2013 | Kim | |
| 2002/0171644 A1 | * | 11/2002 | Reshetov et al. | 345/420 |
| 2004/0012603 A1 | * | 1/2004 | Pfister et al. | 345/582 |
| 2005/0116950 A1 | * | 6/2005 | Hoppe | 345/423 |
| 2007/0052706 A1 | * | 3/2007 | Martin | 345/423 |
| 2008/0043016 A1 | | 2/2008 | Huang | |
| 2009/0184957 A1 | * | 7/2009 | Kim et al. | 345/420 |
| 2010/0091018 A1 | * | 4/2010 | Tatarchuk et al. | 345/423 |
| 2011/0093803 A1 | * | 4/2011 | Ohazama et al. | 715/764 |

(Continued)

FOREIGN PATENT DOCUMENTS

| | | |
|---|---|---|
| CN | 101894358 | 11/2010 |
| TW | 201031143 | 8/2010 |
| TW | 201042952 | 12/2010 |

OTHER PUBLICATIONS

Luiz Velho, Luiz Henrique De Figueiredo, and Jonas Gomes, "A Unified Approach for Hierarchical Adaptive Tesselation of Surfaces," Oct. 1999, ACM Transactions on Graphics, vol. 18, No. 4, pp. 329-360.*

(Continued)

*Primary Examiner* — Kimbinh T Nguyen
(74) *Attorney, Agent, or Firm* — Trop, Pruner & Hu, P.C.

(57) ABSTRACT

A planetary scale object rendering system may provide a plurality of spherical mesh topologies of different levels of detail made up of abutting faces. Tessellation of the faces may be provided at continuous levels of detail. The geometry data at different locations and levels of detail in the mesh topology may be randomly accessible. The geometric data may be organized in quadtrees in some embodiments. A layered quadtree data structure may be formed from the bottom layer up with successively higher parent layers formed from the root nodes of previous child layers. The quadtree structure may be randomly accessed from the top down.

30 Claims, 7 Drawing Sheets

(56) References Cited

U.S. PATENT DOCUMENTS

2011/0310102 A1* 12/2011 Chang ................... 345/423
2011/0313745 A1* 12/2011 Mezghani et al. ............ 703/10
2011/0316854 A1* 12/2011 Vandrovec ................ 345/420

OTHER PUBLICATIONS

Fionn Murtagh, "The Haar Wavelet Transform of a Dendrogram," Jun. 2007, Journal of Classification, vol. 24 Issue 1, pp. 1-38.*

PCT International Search Report and Written Opinion issued in corresponding PCT/US2011/067958, dated Aug. 17, 2012 (9 pages).
Office Action (English translation) Jun. 30, 2014 by the Taiwanese Patent Office in TW application No. 100148028 (5 pages) including search report dated Jun. 27, 2014 (5 pages).
Second Taiwan office action issued by Taiwan Intellectual Property Office in corresponding TW patent application 100148028 dated Dec. 17, 2014, [w/English translation] (10 pages).
Taiwan Search Report issued in corresponding TW patent application 100148028 dated Dec. 15, 2014, [w/English translation] (2 pages).

* cited by examiner

PLANETARY SCALE OBJECT RENDERING

BACKGROUND

This relates generally to planetary scale object rendering. As used herein, planetary scale object rendering involves rendering objects of at least 100,000 times difference in scale.

With planetary object rendering, used, for example, in Google Earth, a user may view the entire Earth and see one level of resolution and then may, effectively, zoom in to a particular region on the Earth and see a greater resolution with respect to the smaller area. Thus, Google Earth allows users to select particular regions to view, how much of those regions to view, and thereby the system determines the resolution that the user may see.

Planetary viewers may provide convenient platforms for visualizing various scientific data, as well as for personal, social, and mass media. Planetary viewers may also be used in navigation, eco-management, geographical oversight and planning, environmental science, emergency planning and response, as well as for entertainment.

Rendering a planetary scale object, such as the Earth, with high precision in real time is challenging for 3D geometry processing due to the large variations in viewing distance and viewing area and the need for real time retrieval of a very large amount of two dimensional data, including surface elevation data. For example, a planetary viewer may view regions as close as one meter and as far as tens of thousands of kilometers, with viewing areas as small as one square meter and as large as the entire hemisphere.

DETAILED DESCRIPTION

In accordance with some embodiments of the present invention, the planetary object is the Earth or another celestial planet, but the present invention can be applied to any planetary scale objects (scale greater than 100,000×). In one embodiment, a planet is approximated as a perfect sphere. This may simplify sampling and interpolation and is easier for calculating surface normals.

In one embodiment, there may be a plurality of fixed or predefined, discrete levels of detail spherical mesh topologies. For example, in one embodiment, eight discrete levels of detail, implemented by spherical mesh topologies, may span from a coarsest level of detail to a finest level of detail. In one embodiment, the coarsest level of detail is 1667×1667 kilometers per patch and the finest level of detail patch is 13.02× 13.02 square kilometers. As used herein, a face is quadrilateral region on a spherical mesh topology (except for the polar area where a face is a triangle) that represents a patch on a real geometrical object.

Figure 1:
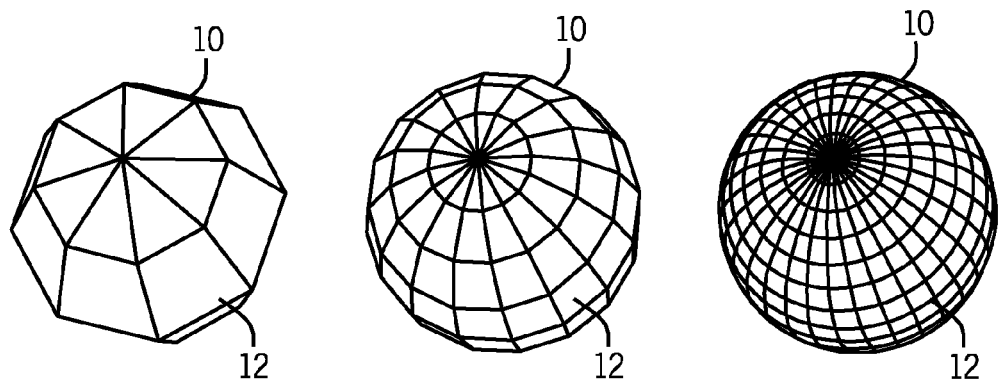
FIG. 1 is a perspective view of three of a plurality of mesh topologies for one embodiment.

Referring to FIG. 1, three of a plurality of spherical mesh topologies 10 to implement a predetermined number of discrete levels of detail may be used in one embodiment. Only three topologies are depicted to illustrate increasing level of detail from left to right. Each mesh topology includes a plurality of faces 12 that are idealized and simplified as flat surfaces. Thus, each mesh topology is made up of a plurality of planar faces representing a given resolution. Each abutting planar face represents a roughly similarly sized and shaped spherical (i.e. non-planar) section, called a patch, of the actual spherical object.

In some embodiments, the fixed or discrete levels of detail implemented by the mesh topologies are supplemented by continuous levels of detail for the mesh topologies and topography data. In some embodiments, efficient data structures may be used for fast network transmission, fast hard disk input/output (I/O), and efficient memory caching.

Figure 2:
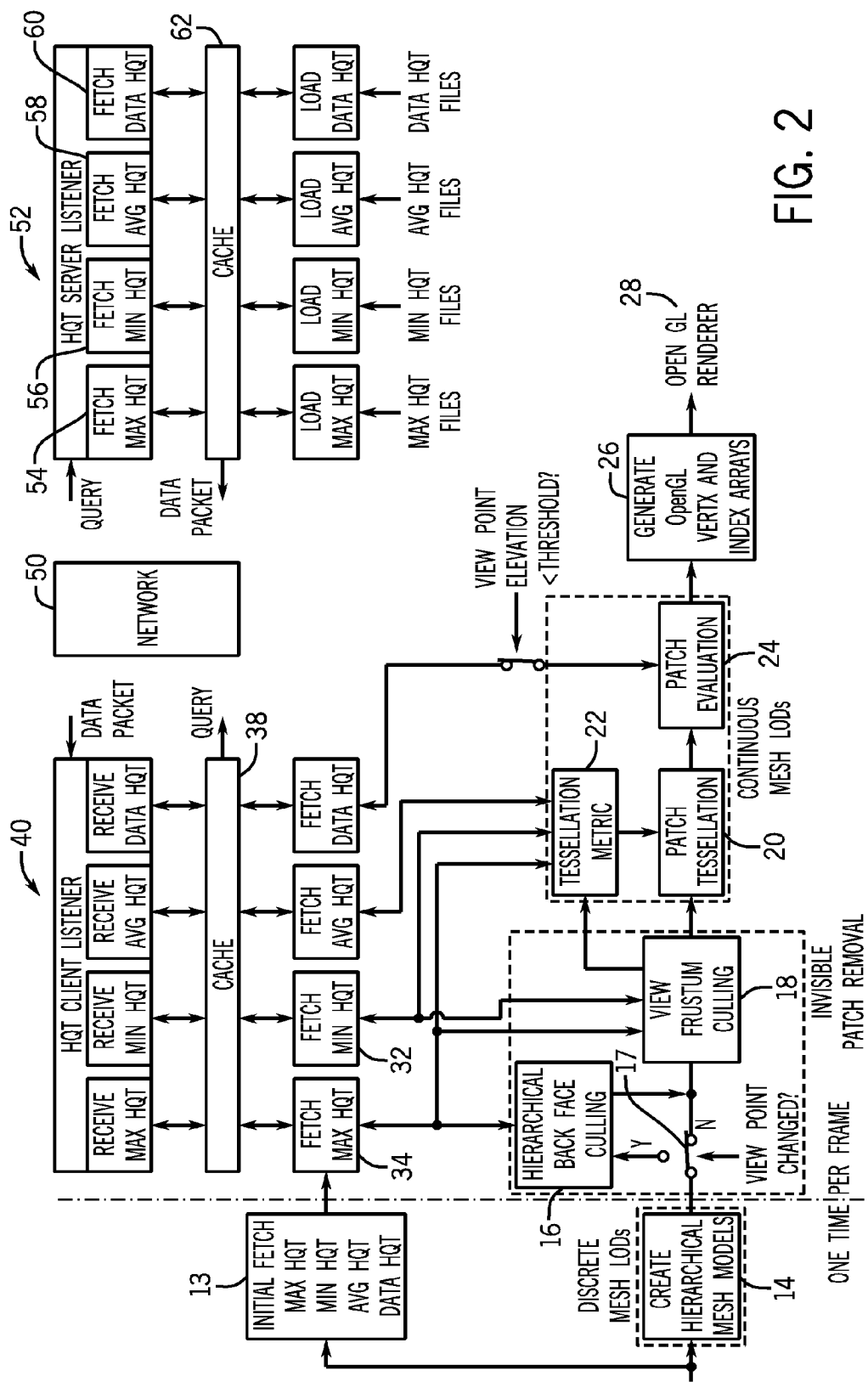
FIG. 2 is a flow chart for a geometry processing pipeline according to one embodiment.

Referring to FIG. 2, a geometry processing pipeline for planetary scale object rendering begins, in one embodiment, by creating hierarchical mesh models, as indicated in block 14. The hierarchical mesh models are the predetermined number of discrete levels of detail, as depicted in FIG. 1. While an example is given in which eight mesh models are used, the number of mesh models may be chosen based on the capabilities of the processing system.

The mesh topologies are not stored, in some embodiments, because they likely would be of a size that would not fit in local storage. It would take two 32-bit floating point values to store the geographical position (i.e. longitude and latitude) of each vertex, one 32-bit integer to index each vertex, one 32-bit integer to index each edge, one 32-bit integer to index each face, and extra index duplications to store the connectivity information. None of this information is stored, but, instead, is generated as needed.

In one embodiment, m hierarchical mesh models (m=8, for example) for m discrete levels of detail (LODs) are used, with every LOD, l, up-sampling its adjacent coarser LOD, l−1, by two. To eliminate the need for storing these models (about 5 million vertices at the finest LOD), the vertices, edges and faces of these LODs are carefully indexed such that their positions and connectivity at any LOD can be computed on demand.

In general, the closer the viewer is to a given patch, the more detail the viewer expects to see and vice versa. There is a correlation between the range of elevation and each of the predetermined mesh LODs and, based on this correlation, the most appropriate LOD mesh topology is selected. Basically, the farther the user is away, the coarser the mesh that is selected. The selection of the LOD is determined by the elevation h of the view point. Each LOD is associated with a minimum elevation threshold, $H_{min}^{1}$. An appropriate LOD, $l^*$, is chosen such that $H_{min}^{l^*-1} > h \geq H_{min}^{l^*}$.

A tessellation is done to determine the number of sample points inside each patch and to triangulate the patch with smaller triangles to achieve a continuous level of detail. Before tessellation, patches that are certain to be invisible to the viewer are removed to reduce computation cost. Invisible patch removal consists of two steps: back face culling and view frustum culling.

Hierarchical back face culling 16 is shown in FIG. 2. The back face culling removes faces on the back side of the spherical mesh facing away from the viewer, depending on how far away the viewer is. Basically, the closer the viewer is to the patch, the less front faces the viewer sees. The unseen faces are culled to simplify the calculation. Since each more detailed mesh topology up-samples its predecessor by two, by adding one more vertex between every two vertices in each of longitude and latitude directions, only the vertices added in the next finer LOD that lie on the boundaries of the coarser LOD needs to be checked for back face culling, in one embodiment. Therefore, instead of performing back face culling directly on the chosen LOD with quadratic algorithm complexity $O(n^2)$, back face culling is done hierarchically by testing the visibility of all vertices at the coarsest LOD and incrementally testing added boundary vertices at each adjacent finer LOD up to the chosen LOD. The hierarchical back face culling has linear algorithm complexity $O(n)$, which is much faster than the quadratic complexity.

Back face culling produces a front face mesh that needs to be updated only when the position of the view point changes. A check at the switch 17 determines whether the view point has changed, which would determine if hierarchical back face culling needs to be performed to update the front face mesh. View frustum culling is then applied to generate a minimal mesh containing only faces potentially in the view frustum. In the view frustum culling 18, the view frustum in 3D space is determined. The three dimensional view frustum indicates what the viewer can see based on the viewer's selected viewing position, elevation, and viewing angle. Patches which are not going to intersect the view may be removed to simplify the calculations.

Back face culling and view frustum culling request per-patch maximum and minimum elevation values for visibility estimation. The hierarchical back face culling 16 uses the maximum elevation data from the fetch max HQT block 34. The view frustum culling 18 uses the minimum elevation from the block 32 and the maximum elevation from the block 34. The complete file of elevation data may be encoded into the maximum elevation, the minimum elevation, and the average elevation data. In some embodiments, the elevation data may be obtained from public sources, such as NASA's Global Digital Elevation Map (GDEM).

Figure 3:
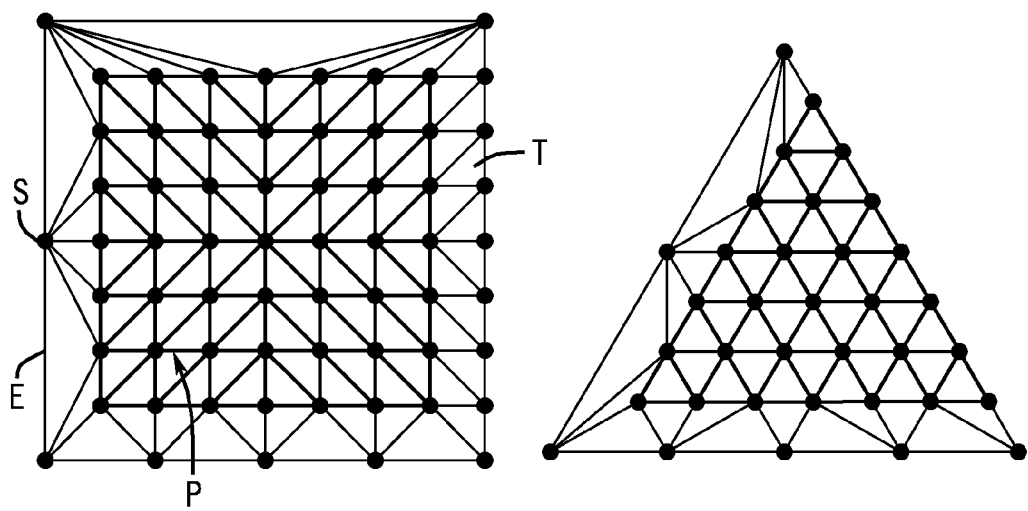
FIG. 3 is a depiction of patch tessellation according to one embodiment.

Once the surfaces have been reduced, the next step is to do the actual tessellation. This involves the invoking of the tessellation metric 22, which basically is the scheme for determining how many sample points are needed for each patch. Samples are added along the edges E outside the selected patch, as well as inside the patch P, as shown in FIG. 3. The number of these samples or sample points S is determined by the tessellation metric 22. Then, once the samples have been chosen, the sample points are connected into triangles T that are ultimately sent to the renderer.

Once a mesh topology has been selected, more details can be added in patches of interest within that topology. Each patch is a quadrilateral of four vertices and four edges. The model may be simplified to use a planar patch in one embodiment.

The patch tessellation 20 adds the samples to the edges and inside the patch and connects the points into triangles that are sent to the renderer. The patch evaluation 24 computes the position and the normal vector of each of the sample points using displacement mapping.

Figure 4:
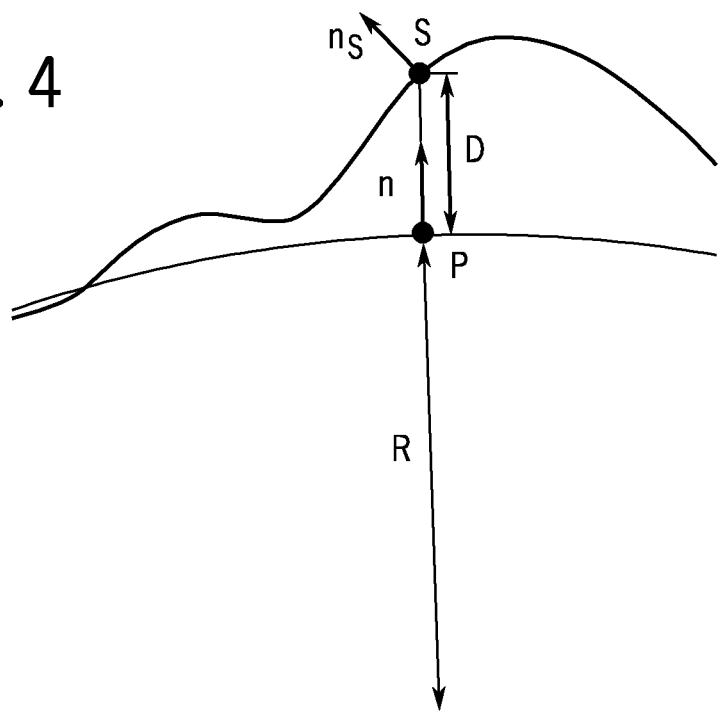
FIG. 4 is a plot showing displacement mapping according to one embodiment.

Displacement mapping is the adjustment from a coarse mesh LOD to a fine detailed mesh LOD. In one embodiment, displacement mapping is the adjustment from the perfect sphere to the actual topography of elevation in the real world. Thus, as shown in FIG. 4, each point P on the sphere of radius R is adjusting by a distance D, along a normal n of the sphere, to the actual position S, on the surface of the Earth. The new surface position and normal vector $n_s$ may be determined using displacement mapping techniques.

Thus, returning to the tessellation metric 22, it decides the tessellation resolution of a patch, i.e. how many sample points S are needed in a patch, to achieve a desirable continuous level of detail. The tessellation resolution of a patch is determined by the tessellation resolutions along the edges of a patch and the tessellation resolution inside a patch.

The tessellation resolution along an edge of a patch determines the number of sample points needed on an edge of a patch. It is done by computing how many segments an edge should be divided into, based on a number of factors.

The first factor is the viewing distance to the edge in question. The points $P_{c1}$ and $P_{c2}$ are the end points of an edge of a patch displaced by the average elevation of the patch and transformed into the camera coordinate system. Since these end points are determined in the camera coordinate system, they correspond to the viewing distance from the view point to the edge. The tessellation metric determines the average of the viewing distances as the first factor.

The second factor is the viewing angle. The edge size on the screen is determined by the viewing angle, so more points may be needed for edges that appear along long edges based on viewing angle. The end points are normalized and then a dot product is taken to give the cosine value of the viewing angle. When the viewing angle is small, the cosine value is large and if the cosine value is in the denominator of the edge tessellation equation $T(e)$, the number of samples will be smaller.

The next factor is the flatness error $\epsilon_{flat}$. If the edge is less flat, then more points will be needed to accurately depict the edge. The flatness error factor takes into account the error from approximating the sphere using the selected LOD mesh and the error due to the amount of elevation change. In one embodiment, an empirical scaling factor $\lambda$ may be used to combine the two error terms.

The next factor takes into account the X and Y direction sizes (Fx and Fy) of the view port. The bigger the view port, the more detail that is needed.

The next factor, called k, is a constant scaling factor to convert the results of the tessellation metric equation into the appropriate range.

Then the tessellation metric $T(e)$ determines how many segments each edge should be divided into:

$$T(e) = k \frac{\varepsilon_{flat}(f)(Fx + Fy)}{|P_{c1} + P_{c2}|\left(1 + \frac{P_{c1}}{|P_{c1}|} \cdot \frac{P_{c2}}{|P_{c2}|}\right)}$$

$P_{c1}$ and $P_{c2}$ are the 3D positions of an edge's two end points displaced by the average elevation of the patch and transformed into the camera's coordinate system.

$$\frac{1}{2}|P_{c1} + P_{c2}|$$

gives the average viewing distance of an edge.

$$\left(1 + \frac{P_{c1}}{|P_{c1}|} \cdot \frac{P_{c2}}{|P_{c2}|}\right)$$

is the viewing angle computed from the dot product of the normalized two end points.

The flatness error of a patch, $\epsilon_{flat}(f)$, i.e. the error of approximating a high order spherical patch by a flat face, is estimated by a weighted sum of the spherical approximation error of the chosen LOD, $\epsilon_{sphere}^l$, and the topographic unevenness bounded by the maximum elevation difference between the maximum elevation $h_{max}(f)$ and minimum elevation $h_{min}(f)$ of the patch, which are derived from the GDEM elevation data in one embodiment, $$\epsilon_{flat}(f) = \epsilon_{sphere}^l + \lambda [h_{max}(f) - h_{min}(f)].$$

The spherical approximation error of a LOD, $\epsilon_{sphere}^l$, is computed, in advance at the time when the LOD is chosen, based on the maximum distance error between a flat face of the LOD mesh and its corresponding perfect spherical patch, $$\varepsilon_{sphere}^l = \sqrt{R\left(1 - \sqrt{\cos^2\frac{\theta^l}{2} - \sin^2\frac{\theta^l}{2}}\right)},$$

where R is the radius of the planet, and $\theta^l$ is the angle in the longitude or latitude direction that a single face of the LOD covers.

Once the tessellation resolution for each edge of a patch T(e) is determined, the tessellation resolution for the inside (i.e. non-edge) points of a patch T(f) by averaging the tessellation resolutions of all the edges of a patch, $$T(f) = \mathrm{avg}_{e \in f} T(e).$$

The tessellation resolution on each outside edge may be readjusted so that edges between adjacent patches are consistent to prevent visual artifacts such as edge cracking. Thus, the common edge determination for two adjacent patches is averaged to get the actual tessellation resolution T(e) for the common edge, $$T(e) = \mathrm{avg}_{e \in f} T(f).$$

Vertices on patch corners may be shared by four or more visible patches. The tessellation resolution of each vertex T(v) is determined by the average tessellation resolution of all the patches that share this vertex, $$T(v) = \mathrm{avg}_{v \in f} T(f).$$

The vertex tessellation resolution is not used for tessellation, but is used to determine the resolution of the topography data to use.

All the above calculations of tessellation resolutions T(f), T(e) and T(v) are done in floating point values, in one embodiment. The final result of T(f), T(e) or T(v), which may end up being an integer plus a fraction, is rounded up to the next higher integer that is a power of 2.

Thus, in one embodiment, the tessellation metric uses the maximum elevation data, the minimum elevation data, and the average elevation data, as indicated in FIG. 2. Note that the corner points $P_{c1}$ and $P_{c2}$ are not the original corner points of the flat patch, but are actually the adjusted points for elevation (adjusted by average elevation of the patch). Therefore, the elevation data is needed in order to make the adjustment.

Given a patch with computed tessellation resolutions, a tessellator generates sub-sampling points with uv coordinates and triangular connectivity. The maximum tessellation resolution is 512, in one embodiment, equivalent to nine additional LODs.

Finally, the positions and normal vectors of the tessellated points are computed by displacement mapping elevation data during patch evaluation and fed to the rendering engine.

At each newly determined sample point, its three dimensional position and surface normal vector are computed using displacement mapping of the elevation data. The tessellation patch evaluation 24 for each patch produces a list of three dimensional coordinates of positions, a list of three dimensional normal vectors, and a list of indices representing the triangular connectivity of the sample points of the patch (block 26). The list of positions, normal vectors, and indices are then fed to OpenGL back end renderer 28 for rendering, in one embodiment.

The hierarchical back face culling, view frustum culling, tessellation metric, and patch evaluation all use elevation data. That data may be retrieved in real time by a server-client asynchronous data fetching system.

When elevation data is needed during hierarchical back face culling, view frustum culling, tessellation metric computation, and patch evaluation, the geometry processing pipeline (FIG. 2) checks the memory cache 38 of the data client 40. If the needed data is not available, the geometry processing pipeline returns with the best data available in the cache 38 and resumes processing. Meanwhile, the data client 40 sends a query over the network 50 to the data server 52 for the required data.

Once a query is received, the server 52 loads the corresponding type of elevation data 54, 56, 58 or 60 specified in the query from hard disk 92 (FIG. 8) and sends the data over the network 50 to the client 40, while storing a copy of the data in its own memory cache 62. Once the client receives the data from the server, the client stores the data in client memory cache 38 so that the data is available for geometry processing thereafter.

Hierarchical back face culling, view frustum culling, and tessellation metric computation require per-patch maximum, minimum and average elevation values, while patch evaluation requires detailed elevation data for displacement mapping. An efficient compression/decompression scheme is needed for real time retrieval of this large-scale data.

A hierarchical lossless compression algorithm may be applied to the elevation data offline to generate different types of elevation data needed by different parts of the geometry processing pipeline. The resulting data are stored in a hierarchical quadtree data structure. A hierarchical lossless decompression at run time allows for quick access to different types of elevation data in any region of interest at any resolution. The hierarchical data structure may be efficient for hard disk input/output on the server, for network transmission between the server and client, and for memory caching on both the server and the client.

Haar wavelets are fast to compute, but do not achieve a high compression ratio. A combination of Haar transform and bit packing is used for random data access and compression in one embodiment. Efficient data structures, file format, and a per-thread cache hierarchy are designed to provide a fast, scalable data encoding and retrieval solution despite the low compression ratio.

The basic 2D Haar transform involves the convolution of four 2×2 templates with the original data, which can be recovered by the same transform plus a scaling factor.

$$\begin{cases} X_{ij} = \begin{bmatrix} x_{00} & x_{01} \\ x_{10} & x_{11} \end{bmatrix} \otimes H_{ij} \\ x_{ij} = \frac{1}{4} \begin{bmatrix} X_{00} & X_{01} \\ X_{10} & X_{11} \end{bmatrix} \otimes H_{ij}, \end{cases}$$

where $$H_{00} = \begin{bmatrix} 1 & 1 \\ 1 & 1 \end{bmatrix},$$

$$H_{01} = \begin{bmatrix} 1 & -1 \\ 1 & -1 \end{bmatrix},$$

$$H_{10} = \begin{bmatrix} 1 & 1 \\ -1 & -1 \end{bmatrix},$$

$$H_{11} = \begin{bmatrix} 1 & -1 \\ -1 & 1 \end{bmatrix}.$$

Figure 7:
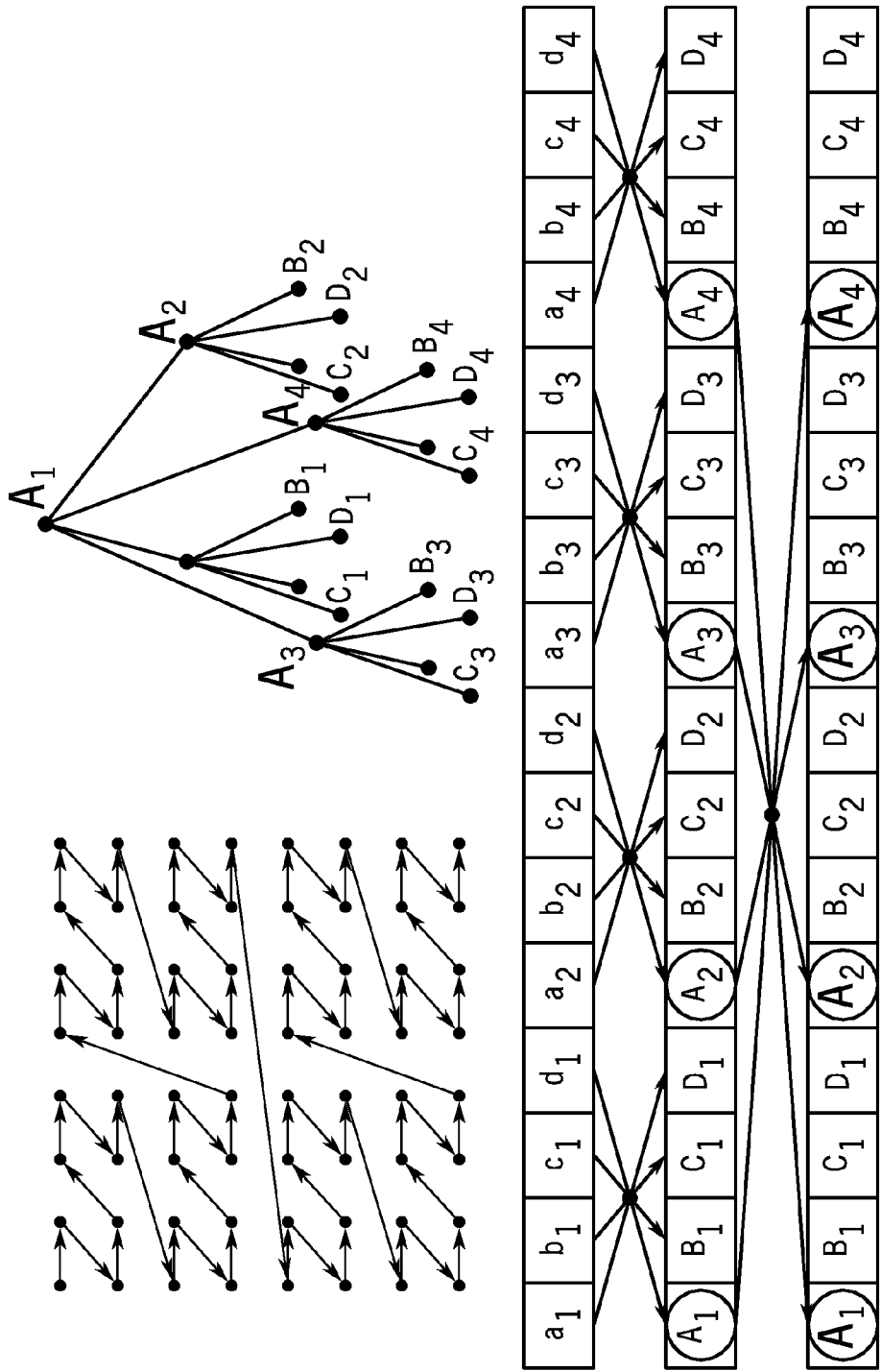
FIG. 7 is a depiction of a hierarchical quadtree for one embodiment.

The Haar transform is essentially an averaging and differencing operation. When applied recursively, using the hierarchical quadtree layout, as shown in FIG. 7, Haar transform concentrates low frequency components in the data, making it particularly suitable for a light-weight bit packing compression method.

Haar transform can be used directly to encode hierarchical per-patch average values. Unfortunately, Haar transform cannot be used to encode hierarchical per-patch maximum or minimum values. For that purpose, a maximum and minimum transform, extending the structure of Haar transform, may be used in some embodiments. A 2D maximum transform can be performed on a 2×2 data grid $$\begin{bmatrix} x_{00} & x_{01} \\ x_{10} & x_{11} \end{bmatrix}$$

as follows to yield a new data grid $$\begin{bmatrix} X_{00} & X_{01} \\ X_{10} & X_{11} \end{bmatrix}:$$

1. Find the maximum value $x'_{00} = \max\{x_{00}, x_{01}, x_{10}, x_{11}\}$:
2. Exchange positions between $x'_{00}$ and $x_{00}$ to ensure that $x'_{00}$ is at the top left corner of the new grid $$\begin{bmatrix} x'_{00} & x'_{01} \\ x'_{10} & x'_{11} \end{bmatrix}.$$

For example, if $x'_{00} = x_{01}$, exchange positions between $x_{01}$ and $x_{00}$ so that $$\begin{bmatrix} x'_{00} & x'_{01} \\ x'_{10} & x'_{11} \end{bmatrix} = \begin{bmatrix} x_{01} & x_{00} \\ x_{10} & x_{11} \end{bmatrix}.$$

3. Difference from the maximum value $$\begin{bmatrix} X_{00} & X_{01} \\ X_{10} & X_{11} \end{bmatrix} = \begin{bmatrix} x'_{00}, & x'_{00} - x'_{01} \\ x'_{00} - x'_{10} & x'_{00} - x'_{11} \end{bmatrix}.$$

4. Concatenate the original position bits of $x'_{00}$ to $X_{11}$. For example, if $x'_{00} = x_{01}$, concatenate the binary number "01" to $X_{11}$.

The inverse maximum transform is straightforward:

1. Extract the original position binary number "ij" of $x'_{00}$ from $X_{11}$.
2. Restore values $$\begin{bmatrix} x'_{00} & x'_{01} \\ x'_{10} & x'_{11} \end{bmatrix} = \begin{bmatrix} X_{00} & X_{00} + X_{01} \\ X_{00} + X_{10} & X_{00} + X_{11} \end{bmatrix}.$$

3. Restore positions by exchanging $x'_{00}$ and $x'_{ij}$.

The maximum transform is essentially a maximizing and differencing operation. When applied recursively using the same hierarchy in FIG. 7, the maximum transform concentrates low frequency components in the data and is suitable for use with bit packing compression method.

This maximum transform can be easily revised into a minimum transform by slightly modifying the maximizing and differencing operations, with the same benefit from the unified hierarchical framework. A 2D minimum transform can be performed on a 2×2 data grid $$\begin{bmatrix} x_{00} & x_{01} \\ x_{10} & x_{11} \end{bmatrix}$$

as follows to yield a new data grid $$\begin{bmatrix} X_{00} & X_{01} \\ X_{10} & X_{11} \end{bmatrix}:$$

1. Find the minimum value $x'_{00} = \max\{x_{00}, x_{01}, x_{10}, x_{11}\}$:
2. Exchange positions between $x'_{00}$ and $x_{00}$ to ensure that $x'_{00}$ is at the top left corner of the new grid $$\begin{bmatrix} x'_{00} & x'_{01} \\ x'_{10} & x'_{11} \end{bmatrix}.$$

For example, if $x'_{00} = x_{01}$, exchange positions between $x_{01}$ and $x_{00}$ so that $$\begin{bmatrix} x'_{00} & x'_{01} \\ x'_{10} & x'_{11} \end{bmatrix} = \begin{bmatrix} x_{01} & x_{00} \\ x_{10} & x_{11} \end{bmatrix}.$$

3. Difference from the minimum value $$\begin{bmatrix} X_{00} & X_{01} \\ X_{10} & X_{11} \end{bmatrix} = \begin{bmatrix} x'_{00}, & x'_{01} - x'_{00} \\ x'_{10} - x'_{00} & x'_{11} - x'_{00} \end{bmatrix}.$$

4. Concatenate the original position bits of $x'_{00}$ to $X_{11}$. For example, if $x'_{00} = x_{01}$, concatenate the binary number "01" to $X_{11}$.

The inverse minimum transform is straightforward:
1. Extract the original position binary number "ij" of $x'_{00}$ from $X_{11}$.
2. Restore values $$\begin{bmatrix} x'_{00} & x'_{01} \\ x'_{10} & x'_{11} \end{bmatrix} = \begin{bmatrix} X_{00} & X_{00} + X_{01} \\ X_{00} + X_{10} & X_{00} + X_{11} \end{bmatrix}.$$

3. Restore positions by exchanging $x'_{00}$ and $x'_{ij}$.

A quadtree unit is the result of Haar, maximum or minimum transform of 4 levels, which encodes 4 LODs of a 16×16 2D data grid. Assuming 32 bits per data entry to cover the range of elevation values and with compression, the size of a quadtree unit is no more than 1 KByte. This is close to the optimum size for network transmission, as the typical size of a network packet is a little over 1 KByte.

Figure 6:
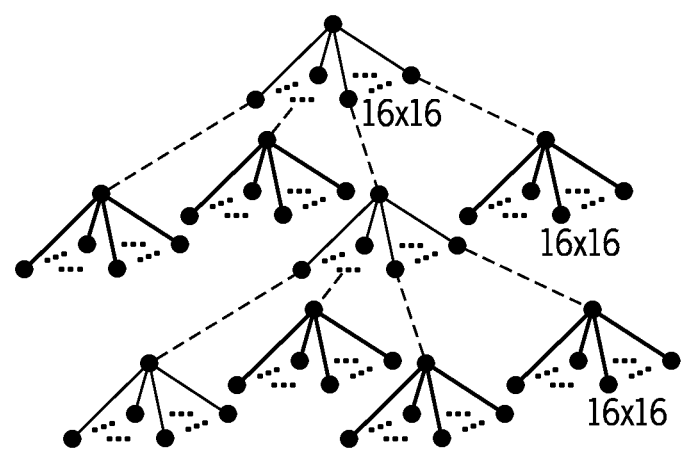
FIG. 6 is a layout of a quadtree hierarchy for one embodiment.

A multi-layer hierarchy of quadtrees is constructed bottom-up, as illustrated in FIG. 6. All the quadtrees at the bottom layer are encoded by recursive Haar, maximum or minimum transform independently. Every 16×16 quadtrees are grouped together and their root node values are used as input to encode their parent quadtree. Note that the root node value of a child quadtree is duplicated in their parent quadtree and this gives two benefits. First, no more than one quadtree needs to be decoded when retrieving a single data point. Second, a quadtree with uniform data does not need to be stored, as the values can be retrieved from its parent quadtree. Each quadtree contains information indicating if each of its child quadtrees exists and, if so, where its data are stored on the hard disk. This avoids unnecessary data fetching and minimize hard disk seek at run time and speeds up hard disk I/O.

Figure 5:
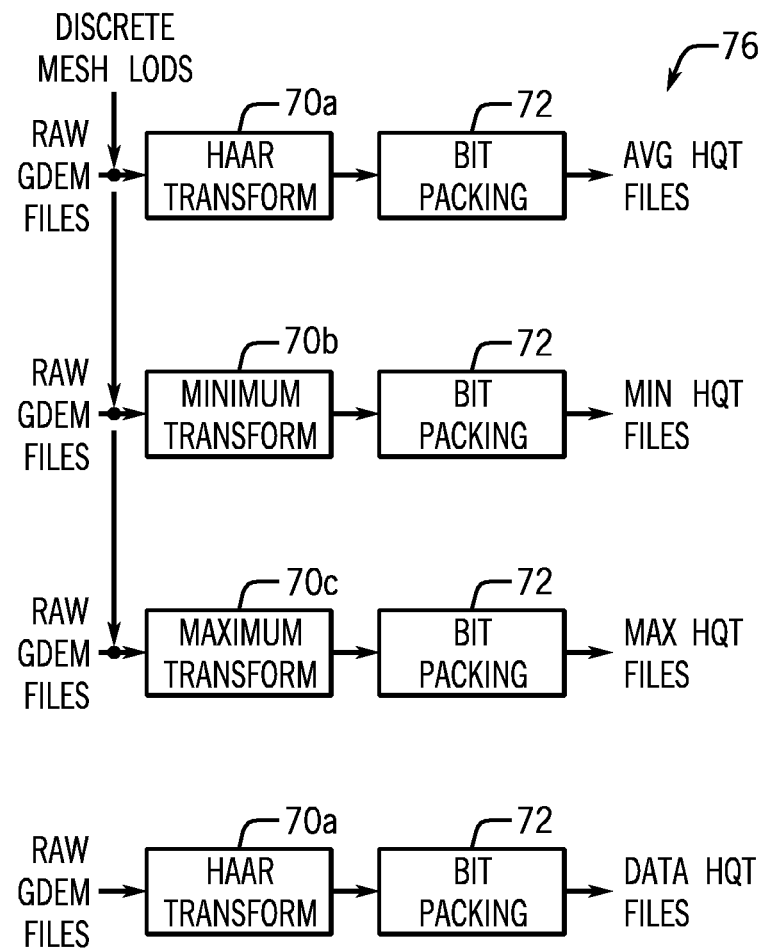
FIG. 5 is a flow chart for offline processing according to one embodiment.

The multi-layer quadtree hierarchy is scalable to any number of LODs. To encode per-patch average, maximum and minimum values, the grid of the quadtree hierarchy is aligned with the discrete LOD mesh models, as shown in FIG. 5. In one embodiment, two layers of quadtrees cover the 8 discrete LODs of per-patch average, maximum and minimum data. The number of layers can be increased to match any given number of discrete LODs.

To encode the detailed topographic data for displacement mapping, the quadtree hierarchy starts from two quadtrees at the top layer corresponding to two hemispheres and spawn child quadtrees recursively until the highest resolution of the original data is covered. In one embodiment, 5 layers of quadtrees are used, equivalent to 20 LODs, to cover the ASTER Global Digital Elevation Map (GDEM) data from NASA, which has a 30 m resolution in spatial location and a 1 m resolution in elevation. Note that the grid of this quadtree hierarchy is not aligned with the discrete LOD mesh models in one embodiment. This is designed to take advantage of the quadtree hierarchy's inherent scalability to data of heterogeneous resolutions, as any subset of quadtrees can be easily replaced by quadtrees of different data with a different resolution. This is particularly useful since the topographic data for a planet such as the Earth usually come in different resolutions for different regions.

Once the quadtree hierarchy is constructed, every 3 layers (or the maximum number of layers, in the case of per-patch value encoding) of quadtrees that descend from a common ancestor quadtree is clustered. The statistics are gathered from all the quadtrees in the cluster to compute a bit-length table, which records the maximum number of bits required for each of 16×16 data entries of all the quadtrees in the cluster. All the quadtrees in the cluster are then compressed by bit-packing according to the resulting bit-length table and stored in a file. The bit-length table is stored in the root quadtree of the cluster for decompression during data retrieval.

The offline construction pipeline of the quadtree hierarchy is shown in FIG. 5. The raw GDEM files are passed to Haar transform 70a. The raw GDEM files are also passed to a minimum transform 70b and to a maximum transform 70c. Then, in each case, bit packing is done at block 72 to produce the appropriate files 76. For encoding per-patch average, minimum and maximum values, the data loaded from the raw GDEM files are arranged to align with the discrete levels of detail mesh models to produce quadtree hierarchies aligned with the discrete levels of detail. For encoding detailed topographic data, the data loaded from the raw GDEM files may or may not align with the discrete levels of detail mesh models.

The choice of 3 layers is empirically determined as a tradeoff between maximizing the bit-packing compression ratio and minimizing the storage of bit-length tables. A better approach to improve the compression ratio without significantly increasing the storage of bit-length tables would be to perform an adaptive clustering on an entire quadtree hierarchy to extract the most representative bit-length patterns for bit-packing.

Figure 8:
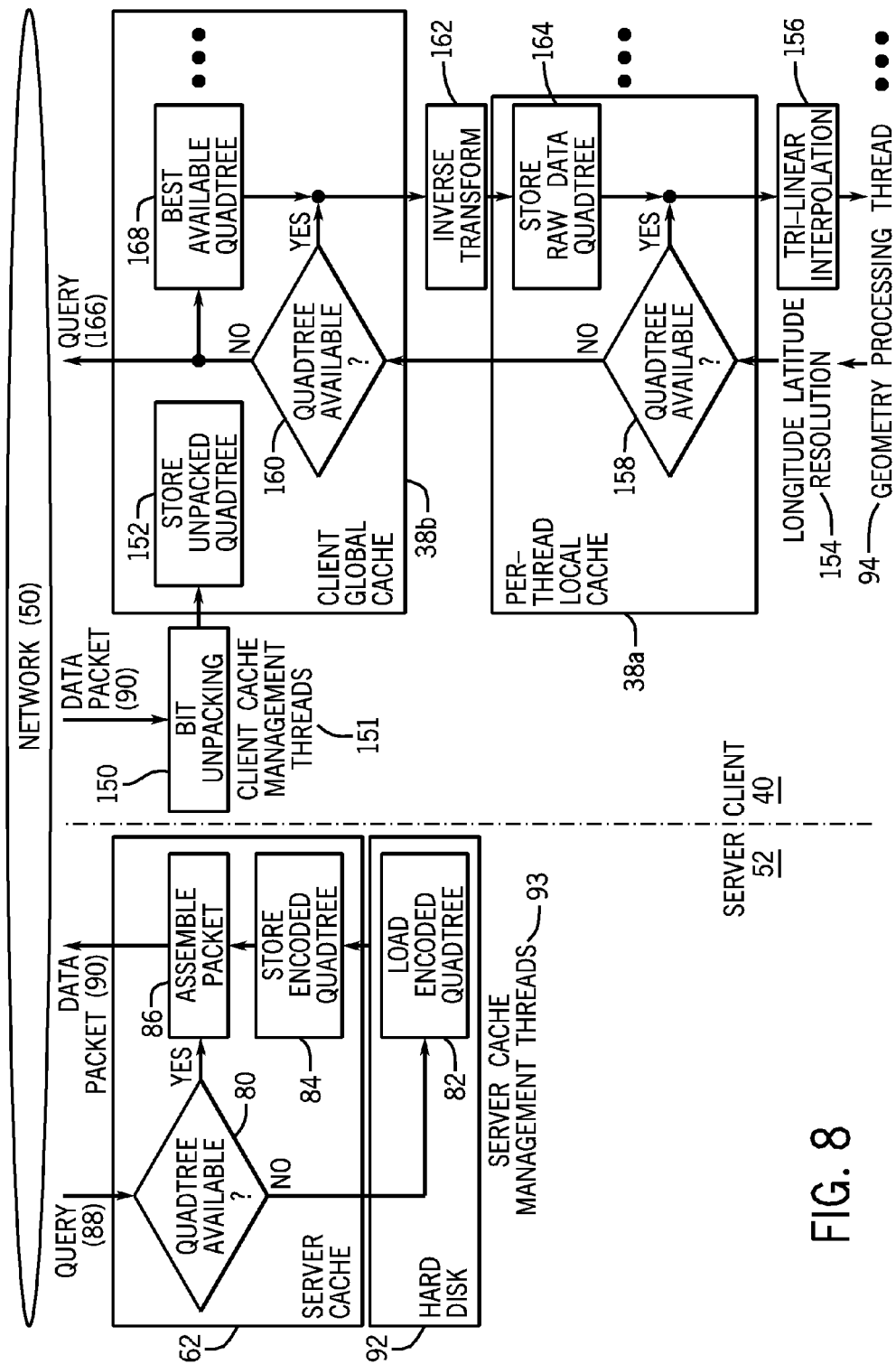
FIG. 8 is a flow chart for a run time retrieval of topographic data according to one embodiment.

In order to guarantee a real-time performance of planetary rendering, a server-client partitioned system is used for asynchronous data fetching at run time, and its pipeline, shown in FIG. 8.

When the client 40 is launched, an initial fetch (block 13 in FIG. 2) sends queries to the server 52 to load the top layers of the maximum, minimum, average and data quadtree hierarchies, encoded as described previously.

On the server 52 side, a group of server cache management threads 93 listen for queries 88 from clients. Whenever a query is received, a server cache management thread checks (diamond 80) the server cache 62 first. If the requested quadtree is already in the cache, it is assembled (block 86) into a network data packet 90 together with its corresponding bit-length table and sent to the client 40 via the network 50. Otherwise, the server cache management thread locates the quadtree based on information available from its cached parent quadtrees and loads it (block 82) from hard disk 92. The quadtree is then assembled (block 86) and sent to the client 40. A copy of the encoded quadtree is stored (block 84) in the server cache 62 for fast retrieval next time the same data is queried.

On the processor of the rendering client 40, there are two groups of threads, geometry processing threads 94 and client cache management threads 151. Whenever a data packet 90 is received from the server, a global cache management thread extracts the encoded quadtree from the packet and unpacks (block 150) its data bits based on the bit-length table coming with the quadtree. The unpacked quadtree is then stored (block 152) in a global cache 38b.

Whenever elevation data are needed during geometry processing, whether per-patch maximum, minimum, average values or detail data values, a geometry processing thread 94 determines the geo-location (i.e. longitude and latitude) and resolution 154 of the data and fetches corresponding raw data quadtrees from its local cache 38a. If they are available, tri-linear interpolation 156 is performed to compute the actual values needed for geometry processing. If a check at diamond 158 determines that a requested quadtree is not in the local cache, the geometry processing thread checks (diamond 160) the global cache 38b. If it is available, the inverse Haar, maximum or minimum transform (block 162) is applied to the unpacked quadtree from the global cache and store (block 164) the 4 LODs of quadtree raw data in the thread's local cache 38*a*. If the requested quadtree is not in the global cache, a query 166 is sent to the server 52. Meanwhile, the best available quadtree in the global cache with the highest resolution is retrieved (block 168), inverse-transformed (block 162), and copied (block 164) to the thread's local cache 38*a*, and further geometry processing continues with the resulting raw data.

The reason for keeping data encoded on the server and decoding in a distributed manner at different stages on the client is to keep storage as compact as possible while minimizing run time computation cost. As the global cache on the client is shared by multiple threads, locking is necessary to prevent a race situation, which is why a per-thread local cache is used to alleviate the lock contention problem. Together with data tiling, the per-thread local cache layer provides the extra benefits of reducing the access frequency to the system memory and improving hardware cache efficiency on the CPU. To take advantage of the quadtree hierarchy, as shown in FIG. 6, whenever a quadtree is requested and cached, all its ancestor quadtrees are retrieved and cached as well. This speeds up the retrieval of the file information, the existence information and the bit-length table of nearby quadtrees, as there is a high change of needing data in neighboring regions.

The server could be replaced by a cloud of server machines where the encoded elevation data are stored in a randomly distributed manner on each of the server machines to speed up the network response during data retrieval. A pre-fetching mechanism can be added to the system based on user interactions from mouse and keyboard inputs to further improve the data retrieval speed. The compression and decompression algorithms and data structures described above can be applied to any large 2D data sets, for example, the terrain texture data, for real time retrieval.

In some embodiments, the geometric processing described above is performed in a CPU. Lighting and shading may be done in a graphics processing unit (GPU) using conventional techniques in one embodiment.

Figure 9:
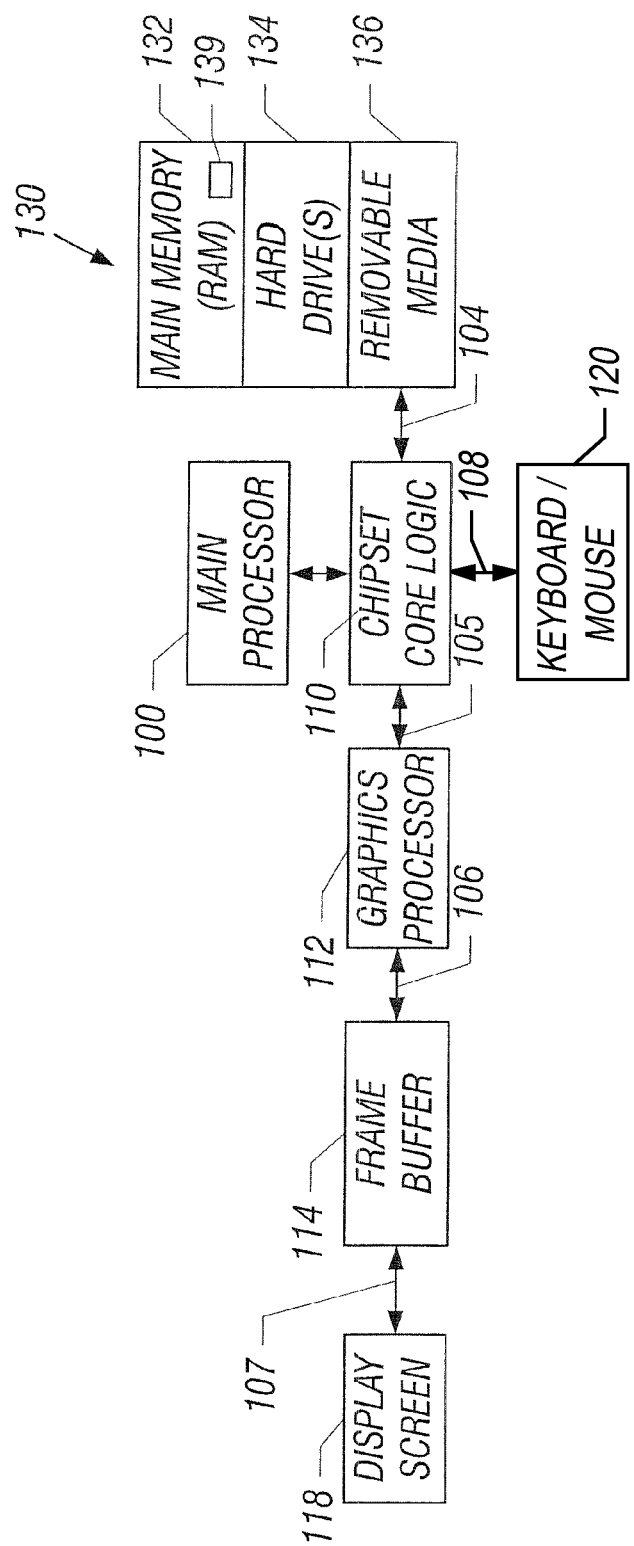
FIG. 9 is a hardware depiction for one embodiment.

The computer system 130, shown in FIG. 9, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The host processor 100 may have multi-threading, single instruction multiple data (SIMD) and double precision, wider advanced vector extensions (AVX) capabilities in some embodiments. In one embodiment, the host processor implements the geometrical processing described herein. In another embodiment, the graphics processor may be integrated with the host processor. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture. In one embodiment, the graphics processor may be used for shading and lighting.

In the case of a software implementation, the pertinent code 139 may be stored in any suitable semiconductor, magnetic, or optical memory, including the main memory 132 or any available memory within the graphics processor. Thus, in one embodiment, the code to perform the sequences of FIGS. 2 and 8 may be stored in a non-transitory machine or computer readable medium, such as the memory 132 or the graphics processor 112, and may be executed by the processor 100 or the graphics processor 112 in one embodiment.

FIGS. 2 and 8 are flow charts. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIGS. 2 and 8.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing when selected, in a graphics processing unit, only one of a plurality of predetermined selectable mesh topologies of different levels of detail in the graphics processing unit, each mesh topology made up of abutting faces, vertices, and edges and generating said faces, vertices and edges for a selected mesh technology at a selected level of detail only when needed;
   enabling continuous levels of detail tessellation of the faces of a selected mesh topology;
   indexing the faces, edges, and vertices;
   computing the positions and connectivities of said faces, edges, and vertices; and
   using backface culling of vertices starting at the coarsest level of detail and incrementally testing the vertices added at each level of detail for each successively less coarse level of detail until the selected level of detail.

2. The method of claim 1 including enabling random access to geometrical data at different locations and levels of detail in a mesh topology.

3. The method of claim 2 including organizing the geometrical data in quadtrees, each quadtree including less than a kilobyte of data.

4. The method of claim 3 including building a layered quadtree data structure from said quadtrees from the bottom layer up, each successively higher parent layer formed from the root nodes of a previous child layer.

5. The method of claim 4 including accessing the structure from the top down.

6. The method of claim 5 including putting information in said quadtrees about their children quadtrees.

7. The method of claim 1 including computing tessellation resolution by combining viewing distance, viewing angle, flatness error, and view port size.

8. The method of claim 7 including computing flatness error using spherical approximation error and topographic unevenness error.

9. The method of claim 1 including using adaptive clustering to extract representative bit-length tables for bit packing compression.

10. The method of claim 9 including applying hierarchical Haar transform to hierarchical maximum and minimum transforms and therefore using a unified quadtree hierarchy data structure for data compression/decompression.

11. A non-transitory computer readable medium storing instructions to enable a processor to:
- select one of a plurality of mesh topologies, including abutting faces, vertices, and edges, at different levels of detail;
- index the faces, edges, and vertices;
- backface cull of vertices starting at the coarsest level of detail and incrementally testing the vertices added at each level of detail for each successively less coarse level of detail until the selected level of detail;
- compute the positions and connectivities of said faces, edges, and vertices at any level of detail on demand; and
- randomly access geometrical data at different locations and levels of detail in a mesh topology.

12. The medium of claim 11 further storing instructions to provide a plurality of selectable mesh topologies of different levels of detail, each mesh topology made up of abutting faces and to enable continuous levels of detail tessellation of the faces of a selected mesh topology.

13. The medium of claim 12 further storing instructions to organize the geometrical data in quadtrees, each quadtree including less than a kilobyte of data.

14. The medium of claim 13 further storing instructions to build a layered quadtree data structure from said quadtrees from the bottom layer up, each successively higher parent layer formed from the root nodes of a previous child layer.

15. The medium of claim 14 further storing instructions to access the structure from the top down.

16. The medium of claim 15 further storing instructions to put information in said quadtrees about their children quadtrees.

17. The medium of claim 11 further storing instructions to compute tessellation resolution by combining viewing distance, viewing angle, flatness error, and view port size.

18. The medium of claim 17 further storing instructions to compute flatness error using spherical approximation error and topographic unevenness error.

19. The medium of claim 11 further storing instructions to use adaptive clustering to extract representative bit-length tables for bit packing compression.

20. The medium of claim 19 further storing instructions to apply hierarchical Haar transform to hierarchical maximum and minimum transforms and therefore using a unified quadtree hierarchy data structure for data compression/decompression.

21. An apparatus comprising:
- a processor to build a layered quadtree data structure from a bottom layer of quadtrees up, each successively higher parent layer formed from the root nodes of a previous child layer, said processor to select one of a plurality of mesh topologies including abutting faces, vertices, and edges at different levels of detail, index the faces, edges, and vertices, backface cull of vertices starting at the coarsest level of detail and incrementally testing the vertices added at each level of detail for each successively less coarse level of detail until the selected level of detail and compute the positions and connectivities of said faces, edges, and vertices at any level of detail on demand; and
- a storage coupled to said processor.

22. The apparatus of claim 21, said processor to provide a plurality of selectable mesh topologies of different levels of detail, each mesh topology made up of abutting faces and to enable continuous levels of detail tessellation of the faces of a selected mesh topology.

23. The apparatus of claim 22, said processor to enable random access to geometrical data at different locations and levels of detail in a mesh topology.

24. The apparatus of claim 23, said processor to organize the geometrical data in quadtrees including less than a kilobyte of data.

25. The apparatus of claim 21, said processor to access the structure from the top down.

26. The apparatus of claim 25, said processor to load information in said quadtrees about their children quadtrees.

27. The apparatus of claim 22, said processor to compute tessellation resolution by combining viewing distance, viewing angle, flatness error, and view port size.

28. The apparatus of claim 27, said processor to compute flatness error using spherical approximation error and topographic unevenness error.

29. The apparatus of claim 22, said processor to use adaptive clustering to extract representative bit-length tables for bit packing compression.

30. The apparatus of claim 29, said processor to apply hierarchical Haar transform to hierarchical maximum and minimum transforms and therefore using a unified quadtree hierarchy data structure for data compression/decompression.

* * * * *